Jan. 8, 1935.    G. A. RICHTER    1,987,214
CYCLIC PROCESS OF PULPING RAW CELLULOSIC MATERIAL
Filed July 18, 1933
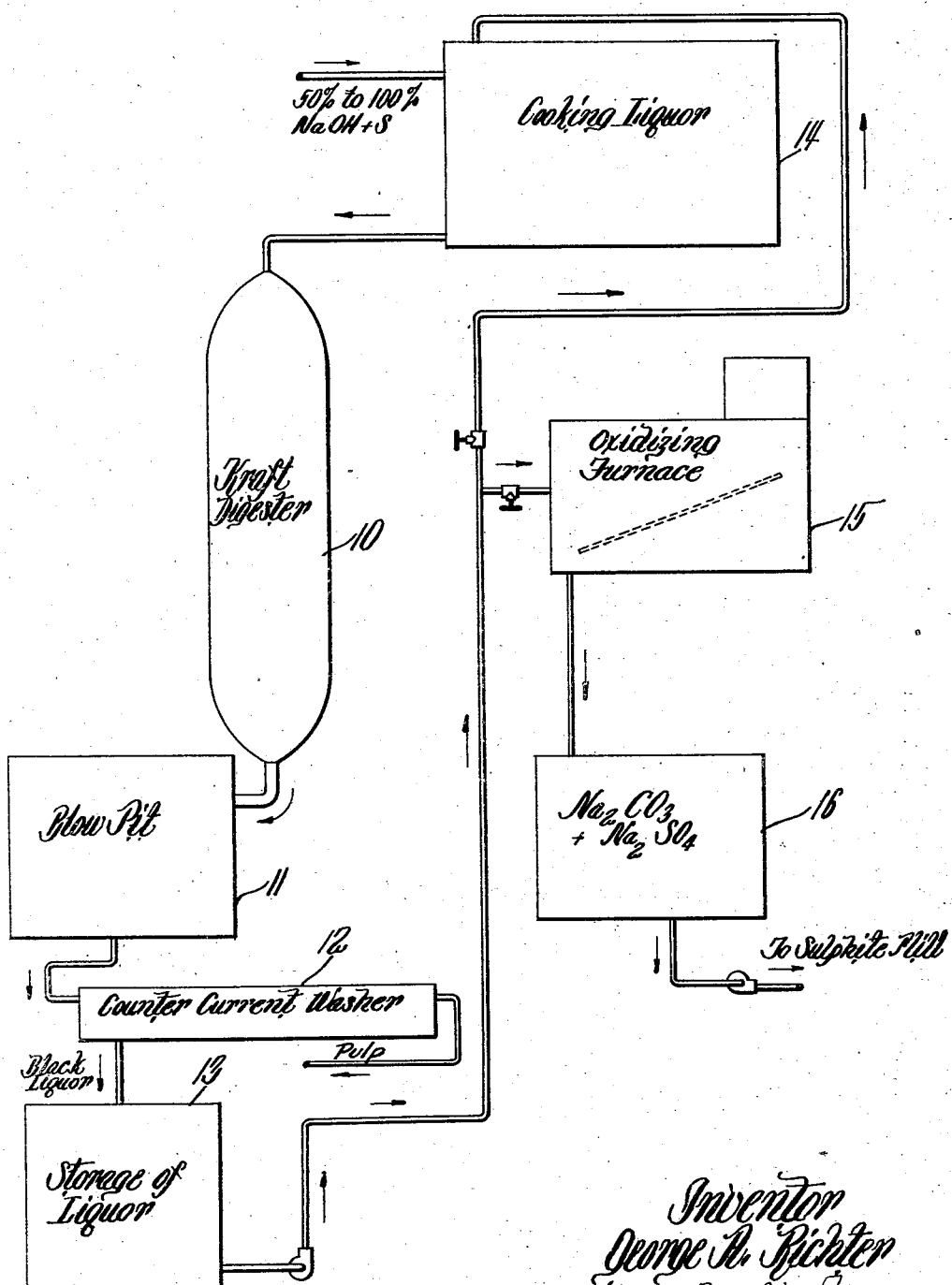

Patented Jan. 8, 1935

1,987,214

UNITED STATES PATENT OFFICE 1,987,214

CYCLIC PROCESS OF PULPING RAW CELLULOSIC MATERIAL

George A. Richter, Berlin, N. H., assignor to Brown Company, Berlin, N. H., a corporation of Maine Application July 18, 1933, Serial No. 680,946

5 Claims. (Cl. 92—13)

This invention relates to a cyclic process of pulping raw cellulosic material wherein pulping is accomplished more particularly in chemical cooking liquors containing caustic soda as a principal fiber-liberating chemical. While the present invention applies to so-called soda cooking liquors whose fiber-liberating action is based practically entirely on caustic soda and to various composite cooking liquors whose fiber-liberating action comes from other chemicals as well as caustic soda, I shall deal with my invention as applied to a so-called kraft cooking liquor which contains caustic soda and sodium sulphide or caustic soda and dissolved elemental sulphur as the essential fiber-liberating agents.

In the usual kraft process, wood or other raw cellulosic material is cooked in liquors wherein the ratio of sodium sulphide to caustic soda varies, depending upon various factors such as the equipment employed for regenerating the valuable chemicals present in the spent cooking liquor. Part of the spent cooking liquor, usually termed black liquor, goes into the preparation of new cooking liquor, and the rest goes to the recovery or regenerating system. It is usually the case that about one-half of the black liquor is reused and the other half subjected to recovery operations.

It is apposite to a clear understanding of the present invention to outline generally the recovery operations to which the black liquor is subjected. In the condition that it is separated from the pulp, the black liquor usually has a total solids content of about 12% to 18%, of which about half is of inorganic nature and originates from the fiber-liberating chemicals and the other half is of organic nature and originates from the wood or other raw cellulosic material. Before the organic content of such black liquor can be efficiently burned and its inorganic content efficiently smelted in a furnace, it is necessary to concentrate the liquor as by multiple effect evaporation to a total solids content of at least about 50%. It is hence the practice so to concentrate the black liquor and then to deliver it to a suitable burning and smelting furnace operated under reducing conditions so as to deliver a smelt consisting essentially of sodium carbonate and sodium sulphide. The smelt is dissolved in water to form a smelt solution and lime is added to the solution to convert the sodium carbonate into caustic soda. The precipitated calcium carbonate is recovered from the causticized solution or so-called white liquor before the latter is used in the preparation of new cooking liquor.

It has been established that efficient causticization of the smelt solution can be had only when such solution contains no more than about 13% to 18% sodium carbonate. In this connection, it might be remarked that the carbonate radical of the sodium carbonate represses the causticizing action of the lime tending to form calcium carbonate and that the higher the concentration of sodium carbonate maintained in the smelt solution, the greater this repression is in consequence of the well-known law of mass action. As already indicated, causticization proceeds to the desired degree only when the sodium carbonate concentration in the smelt solution is kept at or below 18%. Otherwise, the causticized solution has less than optimum effectiveness as a pulping reagent on account of the presence therein of a substantial amount of residual sodium carbonate which is practically inert during the cooking operation and which hence detracts from the economies of the recovery operations. In view of the foregoing, it is plain that the amount of black liquor reused for new cooks is limited by the concentration of alkali present in the causticized smelt solution or white liquor which goes into the preparation of new cooking liquor. In other words, if too much black liquor is used with the white liquor in the preparation of new cooking liquor, the resulting mixed liquor is lacking in sufficient active alkali concentration, that is, is too dilute to promote the desired fiber-liberating action on the wood or other raw cellulosic material cooked therein. In actual practice, as already stated, only about one-half of the black liquor is reused; and, this is practically all the black liquor that can be reused to good advantage.

In accordance with the present invention, I reuse practically all of the black liquor and fortify it to the desired active alkali concentration with highly concentrated caustic soda as in the form of solid caustic soda or in the form of so-called liquid caustic soda of commerce containing 50% caustic soda. This practice is repeated until the black liquor acquires a solids content satisfactory for direct delivery to the burning and smelting furnace, say, a solids content of about 50%, at which time only a small volume of such liquor need be subjected to recovery operations, preferably a volume whose solids content corresponds to the new alkali used and the accretion of organic content during a single cooking operation so that the black liquor may be kept at the desired equilibrium solids content. I have found that the accretion of inorganic and organic solids in the liquor does not seriously affect its usefulness as a pulping reagent particularly in the case of deciduous woods which can be pulped by the same general procedure heretofore used and with a yield and quality of pulp comparable to that heretofore realized despite the fact that the cooking liquor has a high solids content, say, about 50%, and is hence far more viscous than the usual cooking liquor. The small volume of black liquor to be put through the recovery operations can be delivered directly, that is, without further concentration, to a furnace which is preferably operated under oxidizing conditions so as to produce a smelt consisting largely of sodium carbonate and a relatively small proportion of sodium sulphate. The recovered chemicals may be put to various uses, but in those localities where a sulphite mill is being operated conjunctively with a kraft mill, the recovered chemicals may be advantageously treated with sulphurous acid to produce an acid sulphite cooking liquor.

In the accompanying drawing, which illustrates schematically the steps constituting the present invention, 10 represents a digester wherein wood chips or other raw cellulosic material may be cooked under pressure, as ordinarily. In cooking hardwood chips, a kraft liquor initially containing about 800 pounds of active alkali calculated at $Na_2O$ may be used per ton of pulp produced. The cooking liquor may contain about 2 to 2.4 pounds of active alkali per cubic foot calculated at $Na_2O$; and the active alkali present in the form of sulphide may range from 20% to 45% or more. The cooking of the digester contents may be done at a temperature of 330° F. over a period of from 3 to 5 hours, at the end of which time the digester contents may be discharged under pressure as ordinarily into a blow-pit 11 from which the mixture of pulp and black liquor may be delivered to a countercurrent washer 12. The black liquor coming from the countercurrent washer may initially have a total solids content of about 12% to 18%. It is shown passing to a storage tank 13 from which it is sent to a tank 14 wherein concentrated caustic soda of a strength of, say, from 50% to 100%, may be added to produce a new cooking liquor to go into the digester 10. Elemental sulphur is preferably added together with the concentrated caustic soda in preparing the new cooking liquor for reasons presently to be explained. The black liquor is reused in this way repeatedly and substantially in entirety until the total solids content therein has reached about 50%, the caustic soda being added to the black liquor after each cook in amount calculated to build up therein an active alkali content substantially equal to that present in the original cooking liquor. After having attained the desired high solids content in the black liquor, a comparatively small volume is diverted to a burning and smelting furnace 15 which is preferably maintained under an oxidizing atmosphere. The rest of the black liquor is treated as previously described, an amount of water being used along with the fresh caustic soda and sulphur to replace the water accompanying the volume of black liquor going to the recovery system. This amount of water may in practice advantageously be furnished during the separation of the black liquor from the pulp in the countercurrent washer 12, the black liquor separated from the pulp being diluted with water to an extent to offset the loss of water in the volume of black liquor bled from the cycle continuously to the recovery system. It is preferable that the volume of black liquor diverted from reuse be no greater than that carrying the solids, both inorganic and organic, built up in a single cooking operation. In other words, once a total solids content of about 50% is attained in the black liquor, this solids content is substantially maintained in succeeding cycles. It is thus seen that the black liquor after having reached a solids content of at least about 50% is fortified with caustic soda of such concentration as to keep in the black liquor from the succeeding cook a solids content of at least about 50%, and further that black liquor is diverted from the cycle only in such small volume as to keep the volume of fortified liquor in the process substantially constant. As a result of operating the furnace 15 under an oxidizing atmosphere, the smelt issuing therefrom consists essentially of sodium carbonate and a comparatively small amount of sodium sulphate. A chemical pulping mill operated as hereinbefore described can be interrelated to good advantage with an acid sulphite mill as the smelt from the furnace 15 may be dissolved in water in a tank 16 to form a smelt solution which can be treated with sulphur dioxide and thereby converted into an acid sulphite cooking liquor eminently satisfactory for the production of sulphite pulp.

I have already adverted to the desirability of adding free sulphur along with the concentrated caustic soda to the black liquor in preparing new cooking liquor. I have found that in the case of deciduous woods, such as the hardwoods, and other raw cellulosic materials, such as manila and sisal, it is possible to produce pulp simulating in quality the usual kraft pulp by using a cooking liquor whose active alkali is essentially only caustic soda and to which free or elemental sulphur has been added in amount substantially equal to that of the combined sulphur present in the usual kraft cooking liquor. Indeed, the strength and tear resistance qualities of a pulp produced by cooking hardwood in a liquor made up of the caustic soda solution in which elemental sulphur has been dissolved are substantially equal to those inhering in a pulp produced of typical kraft cooking liquor from similar wood. The foregoing is important in connection with the process of the present invention inasmuch as it permits concentrated caustic soda and elemental sulphur to be used in realizing a progressive increase in the solids content of a black liquor and at the same time enable the production of pulp of a quality comparable to that of the usual kraft pulp.

The important advantages to be gained by the process of the present invention may be enumerated as follows:—

(1) It dispenses with an expensive evaporating system for concentrating the spent or black liquor;

(2) It does away with the steps of causticizing and of filtering the precipitated calcium carbonate;

(3) Inasmuch as it does away with the use of lime, the cooking liquor is free from the undesirable calcium salts inevitably present in the liquor regenerated in the usual kraft process. Lime salts cause trouble because of their tendency to cake on hot surfaces.

Although of greater utility in connection with the pulping of deciduous woods, the principles of the present invention may be adopted in connection with the pulping of spruce, pine and other coniferous woods. So, too, they may be applied to composite cooking liquors of various kinds which contain caustic soda as a principal fiber-liberating chemical and which have heretofore been prepared by regeneration from smelt solutions whose sodium carbonate content has undergone causticization with lime.

I claim:—

1. In a cyclic chemical pulping process involving the repeated cooking of raw cellulosic material in liquors containing caustic soda as a principal fiber-liberating chemical, those steps which comprise repeatedly reusing substantially all the spent cooking liquor from one cook in another cook until the total solids content of the spent liquor has been built to at least about 50%, adding caustic soda of a strength ranging from about 50% to 100% to the spent liquor resulting from one cook to furnish the active alkali necessary for a succeeding cook before performing such succeeding cook, and, when the spent cooking liquor has attained a total solids content of about 50%, diverting from reuse spent cooking liquor only in such small volume as to keep the spent liquor at a solids content of at least about 50%.

2. In a cyclic chemical pulping process involving the repeated cooking of raw cellulosic material in liquors containing caustic soda as a principal fiber-liberating chemical, those steps which comprise repeatedly reusing substantially all the spent cooking liquor from one cook in another cook until the total solids content of the spent liquor has been built to at least about 50%, adding caustic soda of a strength ranging from about 50% to 100% and elemental sulphur to the spent liquor resulting from one cook to furnish the chemical necessary for a succeeding cook before performing such succeeding cook, and, when the spent cooking liquor has attained a total solids content of about 50%, diverting from reuse spent cooking liquor only in such small volume as to keep the spent liquor at a solids content of at least about 50%.

3. In a cyclic chemical pulping process involving the repeated cooking of raw cellulosic material in liquors containing caustic soda as a principal fiber-liberating chemical, those steps which comprise repeatedly reusing substantially all the spent cooking liquor from one cook in another cook until the total solids content of the spent liquor has been built to at least about 50%, adding caustic soda of a strength ranging from about 50% to 100% to the spent liquor resulting from one cook to furnish the active alkali necessary for a succeeding cook before performing such succeeding cook, diverting from reuse spent cooking liquor after it has attained a solids content of at least about 50% only in small volume as to keep the spent liquor at a solids content of at least about 50%, and subjecting said diverted liquor to a burning and smelting operation designed to consume its organic content and to smelt its inorganic content into useful chemicals.

4. In a cyclic chemical pulping process involving the repeated cooking of raw cellulosic material in liquors containing caustic soda as a principal fiber-liberating chemical interrelated with a chemical pulping of raw cellulosic material in acid sulphite cooking liquors, those steps which comprise repeatedly reusing substantially all the spent cooking liquor from one cook in another cook until the total solids content of the spent liquor has been built to at least about 50%, adding caustic soda of a strength ranging from about 50% to 100% to the spent liquor resulting from one cook to furnish the active alkali necessary for a succeeding cook before performing such succeeding cook, diverting from reuse spent cooking liquor after it has attained a solids content of at least about 50% only in small volume as to keep the spent liquor at a solids content of at least about 50%, subjecting said diverted liquor to a burning and smelting operation in an oxidizing atmosphere designed to consume its organic content and to produce a smelt containing sodium carbonate, and treating said smelt with a sulphurous acid solution to convert it into an acid sulphite cooking liquor.

5. In a cyclic chemical pulping process which involves the repeated cooking of raw cellulosic material in liquors containing caustic soda as a principal fiber-liberating chemical, those steps which comprise reusing spent cooking liquor whose total solids content has been brought to at least about 50% from one cook in a succeeding cook, fortifying such spent liquor being reused with caustic soda of such concentration as to keep in the spent liquor resulting from the succeeding cook a solids content of at least about 50%, diverting from reuse spent cooking liquor only in such small volume as to keep the volume of fortified liquor in the process substantially constant, and subjecting said diverted liquor to a burning and smelting operation designed to consume its organic content and to smelt its inorganic content into useful chemicals.

GEORGE A. RICHTER.